(12) United States Patent
Nong

(10) Patent No.: US 7,154,885 B2
(45) Date of Patent: Dec. 26, 2006

(54) APPARATUS FOR SWITCHING DATA IN HIGH-SPEED NETWORKS AND METHOD OF OPERATION

(75) Inventor: Ge Nong, Hong Kong (HK)

(73) Assignee: STMicroelectronics Ltd., Hong Kong (HK)

( * ) Notice: Subject to any disclaimer, the term of this patent is extended or adjusted under 35 U.S.C. 154(b) by 925 days.

(21) Appl. No.: 10/036,807

(22) Filed: Dec. 31, 2001

(65) Prior Publication Data

US 2003/0123468 A1    Jul. 3, 2003

(51) Int. Cl.
*H04L 12/56* (2006.01)
(52) U.S. Cl. .................. 370/380; 370/413; 370/427; 370/429
(58) Field of Classification Search ........... 370/380, 370/412, 413, 414, 428, 395.1, 396, 398, 370/395.4, 427, 429
See application file for complete search history.

(56) References Cited

U.S. PATENT DOCUMENTS

| | | | |
|---|---|---|---|
| 6,072,772 A * | 6/2000 | Charny et al. | 370/229 |
| 6,195,335 B1 * | 2/2001 | Calvignac et al. | 370/236 |
| 6,359,861 B1 | 3/2002 | Sui et al. | |
| 6,628,650 B1 * | 9/2003 | Saito et al. | 370/369 |
| 6,667,984 B1 * | 12/2003 | Chao et al. | 370/414 |
| 6,683,872 B1 * | 1/2004 | Saito et al. | 370/380 |
| 6,687,781 B1 * | 2/2004 | Wynne et al. | 710/317 |
| 6,915,372 B1 * | 7/2005 | Magill et al. | 710/317 |
| 2001/0043606 A1 * | 11/2001 | Han et al. | 370/395.1 |
| 2003/0031193 A1 * | 2/2003 | Andrews et al. | 370/412 |

OTHER PUBLICATIONS

Uwe Briem et al., "Traffic Management for an ATM Switch with Per-VC Queuing: Concept and Implementation", Siemens AG, 6 pages.
Ge Nong et al., "Providing QoS Guarentees for Unicast/Multicast Traffic with Fixed/Variable-Length Packets in Multiple Input-Queued Switches", 2001 IEEE, pp. 166-171.
Ge Nong et al., "Analysis of Nonblocking ATM Switches with Multiple Input Queues", IEEE/ACM Transactions on Networking, vol. 7, No. 1, Feb. 1999, pp. 60-74.

* cited by examiner

*Primary Examiner*—Min Jung
(74) *Attorney, Agent, or Firm*—Lisa K. Jorgenson; William A. Munck (57) ABSTRACT

A packet switch for switching cells comprising fixed-size data packets. The packet switch comprises: 1) N input ports for receiving and storing cells in input queues; 2) N output ports for receiving and storing cells from the N input ports in output queues; 3) a switch fabric for transferring the cells from the N input ports to the N output ports, the switch fabric comprising an internally buffered crossbar having N×N internal buffers, wherein each internal buffer is associated with a crosspoint of one of the N input ports and one of the N output ports; and 4) a scheduling controller for selecting a first one of a plurality of queued head-of-line (HOL) cells from the input queues to be transmitted to a first one of the N×N internal buffers according to a fair queuing algorithm in which each of the queued HOL cells is allocated a weight of $R_{ij}$ and wherein the scheduling controller selects a first one of a plurality of HOL cells buffered in a second one of the N×N internal buffers to be transmitted to a first one of the output queues according to a fair queuing algorithm in which each of the internally buffered HOL cells is allocated a weight of $R_{ij}$.

25 Claims, 7 Drawing Sheets

APPARATUS FOR SWITCHING DATA IN HIGH-SPEED NETWORKS AND METHOD OF OPERATION

CROSS-REFERENCE TO RELATED APPLICATIONS

The present invention is related to those disclosed in U.S. patent application Ser. No. 10/036,809, filed concurrently herewith, entitled "SCALABLE TWO-STAGE VIRTUAL OUTPUT QUEUING SWITCH AND METHOD OF OPERATION". Application Ser. No. 10/036,809 is commonly assigned to the assignee of the present invention. The disclosure of the related patent application is hereby incorporated by reference for all purposes as if fully set forth herein.

TECHNICAL FIELD OF THE INVENTION

The present invention is generally directed to packet switching networks and, more specifically, to a high-throughput scheduler and related scheduling algorithms for use in a fixed-size data packet switch.

BACKGROUND OF THE INVENTION

Packet switching involves the transmission of data in packets through a data network. Fixed-sized packets are referred to as cells. Each block of end-user data that is to be transmitted is divided into cells. A unique identifier, a sequence number and a destination address are attached to each cell. The cells are independent and may traverse the data network by different routes. The cells may incur different levels of propagation delay, or latency, caused by physical paths of different lengths. The cells may be held for varying amounts of delay time in buffers in intermediate switches in the network. The cells also may be switched through different numbers of packet switches as the cells traverse the network, and the switches may have unequal processing delays caused by error detection and correction.

A general model of a N×N switch includes N input ports, N output ports, a time (or space) division interconnecting network (or switching fabric) and a scheduler. Operations of the switch are synchronized over fixed-size time slots. Packets arrive at the switch by input links and depart the switch via output links. An arriving packet could be variable or fixed length, unicast or multicast. A packet is multicast if it has more than one destination output port. Otherwise, it is a unicast packet.

As a variable length or multicast packets can be transferred into fixed-length and unicast packets by methods well-known in the art, without loss of generality, it is assumed herein that fixed-length and unicast packets only are being discussed. Conforming to the literature, the term "cell" is used hereafter to refer a fixed-length packet. Each cell consists of two fields: the header and the payload. The destination output port number of a cell is encapsulated in the header.

Without loss of generality, each input-output link is assumed to transmit data at a speed of one cell per time slot. However, it is not necessary for a link (connecting to an input-output port) of the interconnecting network to operate at the same speed as an input-output link. If each link of the interconnecting network operates at a speed of S times the speed of each input-output link, it is said that the switch has an internal speed-up of S. It is noted that S may be equal to 1. In a switch with an internal speed-up S, each input or output can transmit to or receive from the interconnecting network up to S cell(s) in each time slot, respectively. During each time slot, the interconnecting network is capable of being configured by the scheduler to simultaneously set up a set of transmission paths between any pair of input and output, provided that no more than S cells are transmitted by an input or received by an output.

Due to the unscheduled characteristics of cells arriving at different input ports, cells destined for the same output port may simultaneously arrive at the switch from many input ports. Consequently, to suppress cell losses, it is necessary to provide buffers in a switch to accommodate incoming cells before they can be relayed to the next hop. Depending on where the buffering of cells is provided, a queuing strategy may be based on output queuing, shared queuing, input queuing, or combined input-output queuing, as follows.

Output queuing (OQ): During each time slot, a cell arriving at any input port is immediately stored into a buffer that resides at the destination output port. In a worst-case scenario, at most N write operations and 1 read operation must be performed by a single OQ buffer during each time slot.

Shared queuing (SQ): A single buffer is shared by all of the input ports and output ports of the switch. Cells are stored into and read from the SQ buffer upon their arrivals and departures, respectively. In a worst-case scenario, at most N write operations plus N read operations can occur at the buffer, imposing a more stringent bandwidth requirement than an OQ buffer.

Input queuing (IQ): To avoid using high-bandwidth buffers as in OQ and SQ schemes, a buffer is maintained by each input port for incoming packets. With a properly designed scheduling algorithm, a set of input-output contention free cells is selected from the buffered ones for transmissions to their destination output ports, from time slot to time slot. With this queuing scheme, the bandwidth demand of each input buffer can be reduced to the least of one write operation and one read operation per time slot.

Combined input-output queuing (CIOQ): In a CIOQ scheme, buffers are provided at both input and output ports. Compared to a pure IQ switch, the output buffers of CIOQ introduce more freedoms to the designing of scheduling algorithms and enable the choice of an intermediate internal speed-up between the two extremes of 1 and N, for IQ and OQ switches, respectively. Therefore, a CIOQ switch can achieve a good compromise between the good performance of OQ switches and the good scalability of IQ switches. As a result, the CIOQ scheme has been widely accepted as the most promising candidate for building scalable switches.

Among the above-mentioned switch architectures, OQ and SQ switches achieve the best performance. However, OQ and SQ switches have the worst scalability, since the bandwidth of an OQ or an SQ buffer grows linearly as the aggregated input-output link rate increases. The best scalability is achieved by an IQ or a CIOQ switch with each input buffer maintaining a single FIFO for all incoming cells. Despite its architectural simplicity, however, the maximum throughput of an IQ switch with FIFO queuing is only 58.2% for uncorrelated (Bernoulli) traffic with destination outputs distributed uniformly and is even worse for correlated (on/off bursty) traffic. The poor performance is caused by well-known HOL (head of line) blocking problems, in which a cell queuing behind the HOL cell of a FIFO cannot participate in scheduling, even if both its residing input and its destination output are idle.

Numerous alternatives for organizing an input buffer of an IQ or CIOQ switch have been proposed by various parties over past years to overcome the HOL problem of the single FIFO queuing. One alternative attracting great interest is the virtual output queuing (VOQ) scheme, also known as the multiple input queuing scheme. In a VOQ scheme, cells awaiting at an input buffer are organized as N separate queues according to their destination output ports. Such a queuing scheme has been shown to be able to achieve the best performance of an IQ switch (i.e., 100% throughput can be achieved by a VOQ switch independent of the offered traffic). However, the high complexity of scheduling queued cells in a VOQ switch brings up a new problem, namely, the scheduling algorithms for achieving 100% throughput have a complexity of $O(N^3 LogN)$, which is impractical under high-speed environments. As a consequence, the key to putting into practice a VOQ switch with good performance is the reduction of the scheduling complexity.

In summary, the bottleneck identified by research for scaling IQ and CIOQ switches is the scheduling complexity and the bottleneck for OQ and SQ switches is the speed-up N buffer. So far, the best existing results for an N×N switch are:

Input queuing: A throughput of 100% may be achieved by a scheduling complexity of $O(N^3 LogN)$ and using speed-up 1 input buffers. The scheduling complexity constitutes the bottleneck.

Output queuing and shared queuing: A throughput of 100% may be achieved by a scheduling complexity of $O(NLogN)$ and using speed-up N output (or shared) buffers. The speed-up N output (or shared) buffers constitute the bottleneck.

Combined input-output queuing: A throughput of 100% may be achieved by a scheduling complexity of $O(N^2)$ and using speed-up of 2 input and output buffers. The scheduling complexity constitutes the bottleneck.

The good scalability of an IQ/CIOQ switch is offset by the great efforts needed by scheduling the accesses of buffered cells to the interconnecting network.

Therefore, there exists a need in the art for improved apparatuses and methods for high-speed data switching. In particular, there is a need for high-speed switches and routers that attain high throughput and scalability while relying on simple scheduling algorithms.

SUMMARY OF THE INVENTION

The present invention provides unique scheduling algorithms for use in switch architectures that together achieve good scalability by circumventing the difficult problems limiting the scalabilities of IQ, CIOQ, OQ and SQ switches. Research on salable high-bandwidth switches have been evolving in two opposite directions and going into two extremes: either to develop novel scheduling algorithms for pure VOQ switches or to exploit advanced silicon technologies to expand as large as possible the bandwidth and the size of the OQ buffers of CIOQ switches. Unfortunately, both approaches are reaching their limits without achieving breakthroughs of the bottlenecks. Moreover, according to Moore's Law, the advance of silicon technologies in the future is most likely not on the density, but the speed. Consequently, it is anticipated that little can be done in the future to build scalable switches along these two exiting directions to meet the ever-increasing network bandwidth.

As mentioned before, a CIOQ switch is a compromise between IQ and OQ switches. Using large OQ buffers in a CIOQ switch is practice prohibited, as it will eventually come up against the same bottleneck of an OQ switch. Therefore, the most approach for building a truly scalable switch is to solve the scheduling bottleneck of a VOQ switch, so that a VOQ/CIOQ switch with each input/output buffer having an extremely small speed-up (e.g., 1 or 2) may be implemented.

Unlike previous work that tried to lower the algorithmic complexity of scheduling a VOQ switch for good performances, the present invention solves the scheduling problem of a VOQ switch by a hybrid algorithmic and architectural method. In brief, a new buffering block is introduced into the original VOQ/CIOQ switch and distributive scheduling algorithms with far lower complexities are elaborated to achieve good switch performances.

According to an exemplary embodiment of the present invention, a high-bandwidth data switch consists of a plurality of input and output ports, an internal buffered crossbar and a scheduler. Operations in the switch are synchronized over fixed-size time slots. Data encapsulated in cells arrive at the switch at each input port, are transmitted to the destination output ports via the internal buffered crossbar controlled by the scheduler, and depart from the switch at each output port. A queue is separately maintained at each input port for cells destined for each output ports. Further, a buffer situated at each interconnection point of the internal buffered crossbar is provided for cells transmitted between the corresponding pair of input and output ports.

Four kind of scheduling algorithms are described to achieve the optimal performances in terms of high throughput and bandwidth guarantees (i.e., achieving 100% throughput for traffic with bandwidth guarantees, or achieving high throughput (not less than 90%) for traffic without bandwidth guarantees, and exact emulating an output queuing switch using an internal speedup of 2).

To address the above-discussed deficiencies of the prior art, it is a primary object of the present invention to provide a packet switch for switching cells comprising fixed-size data packets. According to an advantageous embodiment of the present invention, the packet switch comprises: 1) N input ports capable of receiving and storing cells in a plurality of input queues; 2) N output ports capable of receiving and storing cells from the N input ports in a plurality of output queues; 3) a switch fabric for transferring the cells from the N input ports to the N output ports, the switch fabric comprising an internally buffered crossbar having N×N internal buffers associated therewith, wherein each internal buffer is associated with a crosspoint of one of the N input ports and one of the N output ports; 4) a scheduling controller capable of selecting a first one of a plurality of queued head-of-line (HOL) cells from the input queues to be transmitted to a first one of the N×N internal buffers according to a fair queuing algorithm in which each of the queued HOL cells is allocated a weight of $R_{ij}$ and wherein the scheduling controller is further capable of selecting a first one of a plurality of HOL cells buffered in a second one of the N×N internal buffers to be transmitted to a first one of the output queues according to a fair queuing algorithm in which each of the internally buffered HOL cells is allocated a weight of $R_{ij}$, wherein a group of K queues share a combined capacity of 1, and $$\sum_{i=1}^{K} R_i \leq 1,$$

where $R_i$ is the guaranteed bandwidth associated with queue i, wherein any queue being non-empty over a time interval T can be guaranteed a bandwidth of $R_iT+E$, where E is a constant.

According to one embodiment of the present invention, the N×N internal buffers are disposed within the switch fabric.

According to another embodiment of the present invention, at least some of the N×N internal buffers are disposed within the N input ports.

According to still another embodiment of the present invention, at least some of the N×N internal buffers are disposed within the N output ports.

According to yet another embodiment of the present invention, the N×N internal buffers are configured within the N output ports such that each output port has a fast internal speed-up of N output buffer that is shared at least partially by cells from all input ports.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise", as well as derivatives thereof, mean "inclusion without limitation"; the term "or", is inclusive, meaning "and/or"; the phrases "associated with" and "associated therewith", as well as derivatives thereof, may mean "include", "be included within", "interconnect with", "contain", "be contained within", "connect to or with", "couple to or with", "be communicable with", "cooperate with", "interleave", "juxtapose", "be proximate to", "be bound to or with", "have", "have a property of", or the like; and the term "controller" includes any device, system or part thereof that controls at least one operation, such a device may be implemented in hardware, firmware or software, or some combination of at least two of the same. In particular, a controller may comprise a data processor and an associated memory that stores instructions that may be executed by the data processor. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 11, discussed below, and the various embodiments used to describe the principles of the present invention in this patent document are by way of illustration only and should not be construed in any way so as to limit the scope of the invention. Those skilled in the art will understand that the principles of the present invention may be implemented in any suitably arranged fixed size packet data switch.

Figure 1:
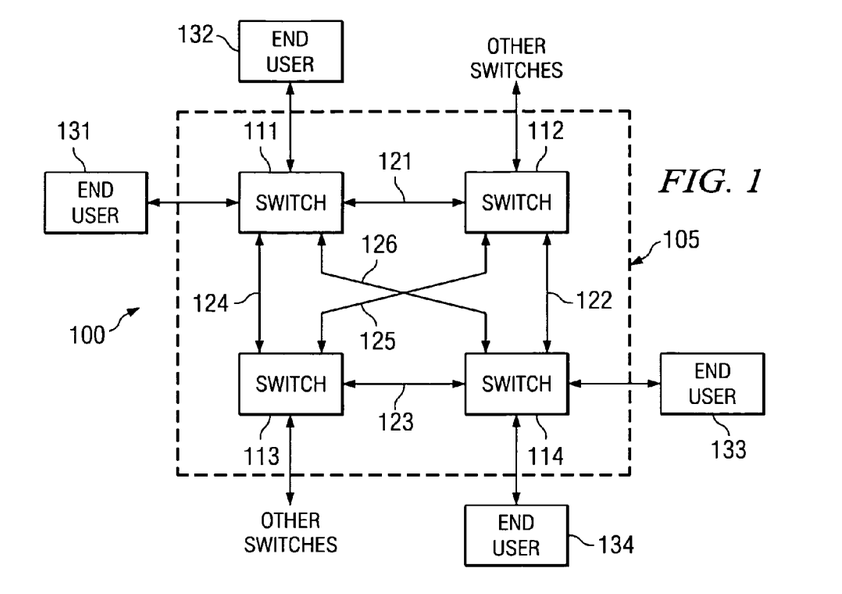
FIG. 1 illustrates an exemplary packet switching network containing packet switches in accordance with the principles of the present invention.

FIG. 1 illustrates an exemplary packet switching network 100 containing packet switches 111–114 in accordance with the principles of the present invention. Packet switching network 100 contains a subnetwork 105, indicated by a dotted line, comprising packet switches 111–114, that interconnects end-user devices 131–134 with each other and with other switches (not shown) and other end-user devices (not shown) associated with packet switching network 100. Packet switches 111–114 are interconnected by data links 121–126. Subnetwork 105 is intended to be a representative portion of packet switching network 100, which may contain many other redundant packet switches similar to packet switches 111–114.

End-user devices 131–134 each may comprise any commonly known processing device, such as a telephone, a personal computer (PC), a fax machine, an office LAN, a network server, or the like, that may communicate via a packet switching network. For example, end-user 131 may comprise a remote network server that is sending a data file to end-user 133, which is a desktop PC. The data file that is to be transmitted is segmented into fixed-size data packets (or cells) in end-user 131. An identifier for the data transfer is appended to each data cell. A sequence number is also appended to each data cell, as is a destination address associated with end-user 133.

Next, the data cells are transferred to packet switch 111. Packet switch 111 may transfer the data cells to end-user 133 by several physical paths. For example, packet switch 111 may send the data cells directly to packet switch 114 across data link 126. If the data traffic load on data link 126 is heavy, packet switch 111 may send some or all of the data cells indirectly to packet switch 114 via data link 121, packet switch 112, and data link 122. Alternatively, packet switch 111 may send some or all of the data cells indirectly to packet switch 114 via data link 124, packet switch 113, and data link 123. Packet switch 114 transfers the data cells to end user device 133, which uses the identifier information and the sequence numbers from each data cell to reassemble the original data file sent by end-user device 131.

Figure 2:
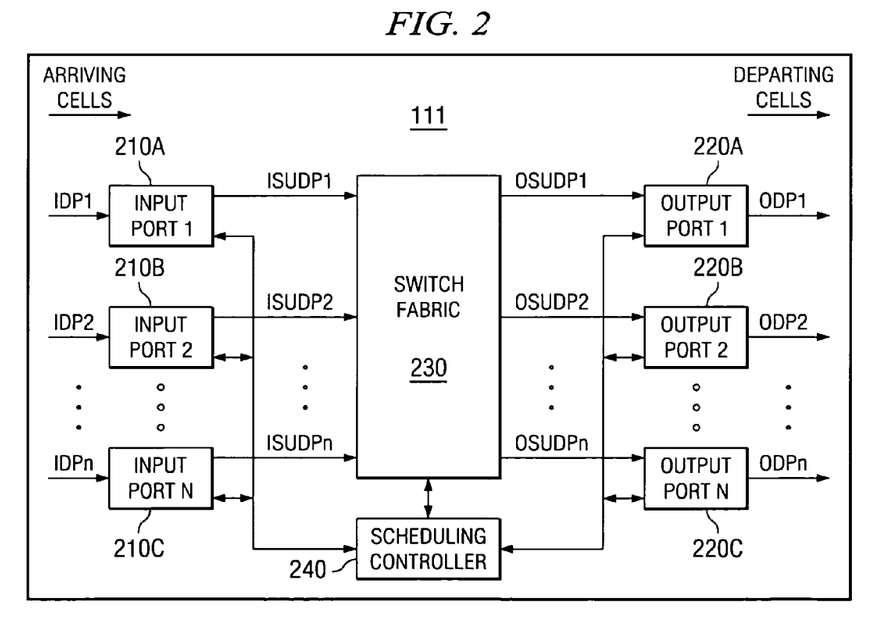
FIG. 2 illustrates in greater detail selected portions of the exemplary packet switch according to one embodiment of the present invention.

FIG. 2 illustrates in greater detail selected portions of exemplary packet switch 111 according to one embodiment of the present invention. Packet switch 111 comprises N input ports 210, N output ports 220, switch fabric 230, and scheduling controller 240. N input ports 210 include exemplary input ports 210A, 210B, and 210C, which are arbitrarily labeled Input Port 1, Input Port 2, and Input Port N, respectively. N output ports 220 include exemplary output ports 220A, 220B, and 220C, which are arbitrarily labeled Output Port 1, Output Port 2, and Output Port N, respectively.

Cells arrive on N input data paths, including exemplary input data path 1 (IDP1), input data path 2 (IDP2), and input data path N (IDPn), and are buffered in the N input ports 210. The buffered cells are transferred under the control of scheduling controller 240 to switch fabric 230 over N input speed-up data paths, including exemplary input speed-up data path 1 (ISUDP1), input speed-up data path 2 (ISUDP2), and input speed-up data path N (ISUDPn). The switched cells are transferred under the control of scheduling controller 240 from switch fabric 230 to N output ports 220 over N output speed-up data paths, including exemplary output speed-up data path 1 (OSUDP1), output speed-up data path 2 (OSUDP2), and output speed-up data path N (OSUDPn).

Figure 3:
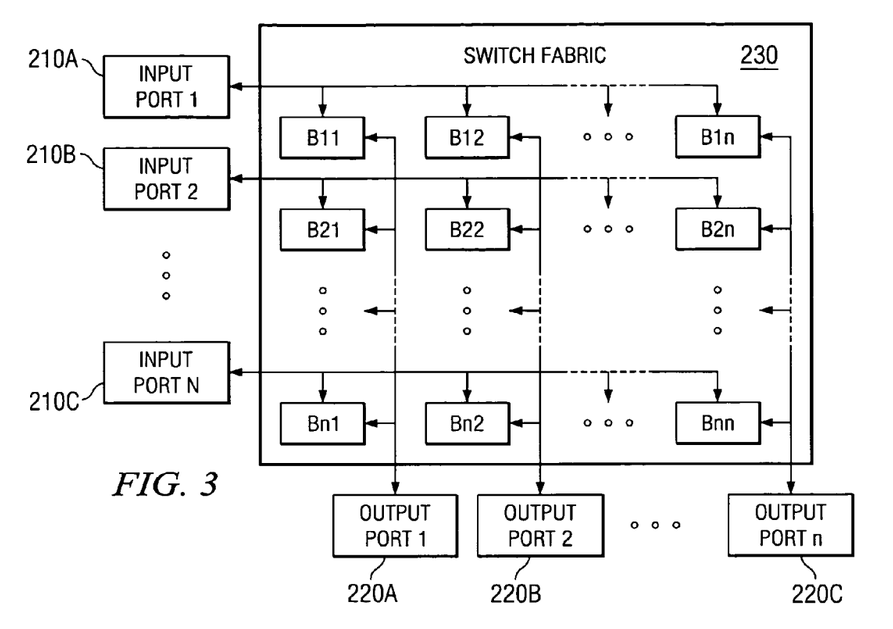
FIG. 3 illustrates the switch fabric in the exemplary packet switch in greater detail according to an advantageous embodiment of the present invention.
Figure 4:
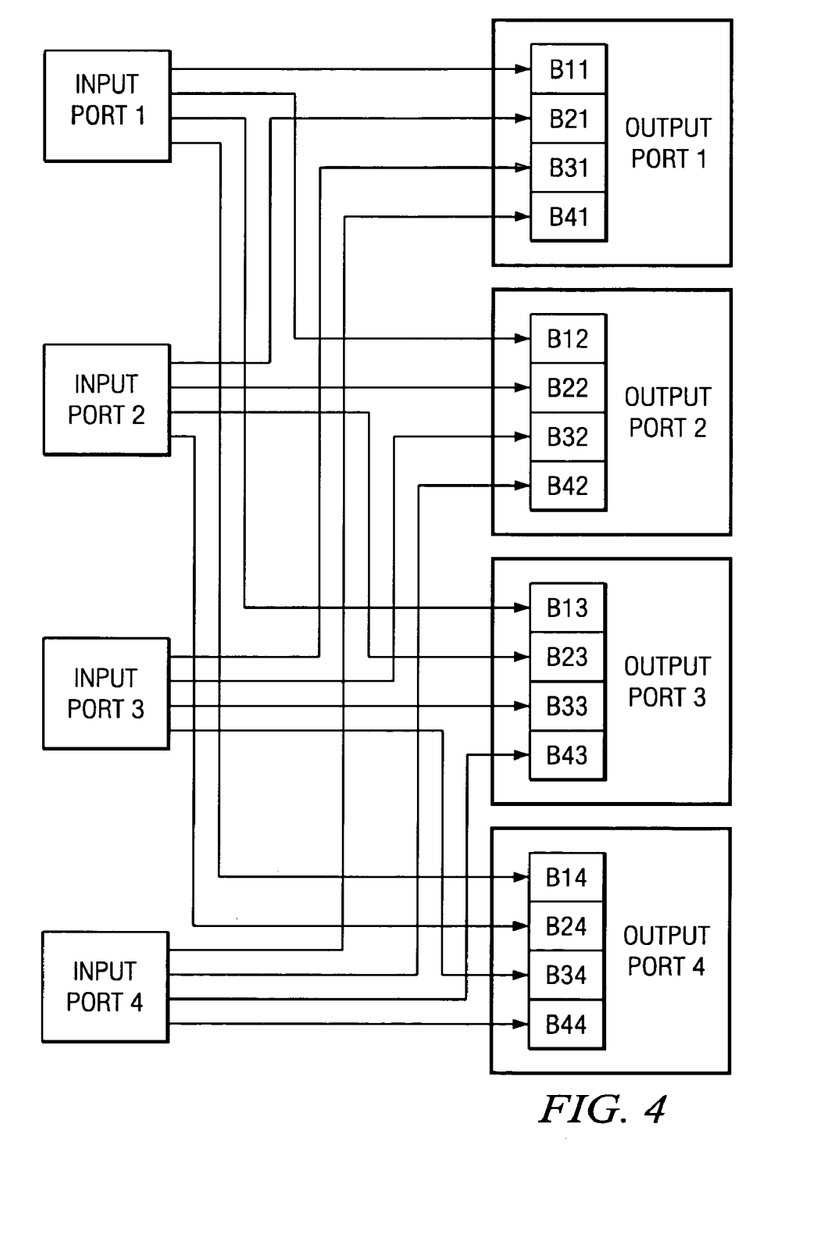
FIG. 4 illustrates a distributed switch fabric in the exemplary packet switch according to a first alternate embodiment of the present invention.
Figure 5:
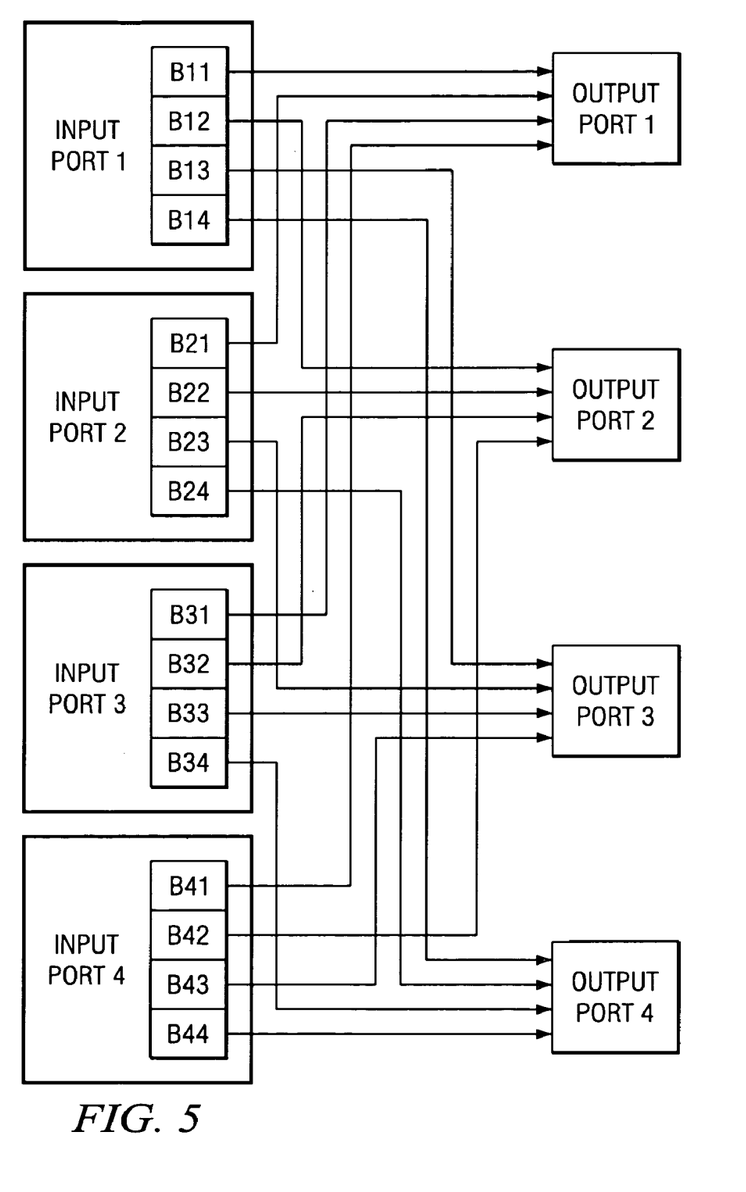
FIG. 5 illustrates a distributed switch fabric in the exemplary packet switch according to a second alternate embodiment of the present invention.

FIG. 3 illustrates switch fabric 230 in packet switch 111 in greater detail according to an advantageous embodiment of the present invention. Switch fabric 230 comprises an internally buffered crossbar containing N×N internal buffers, $B_{i,j}$. Each buffer is located at a crosspoint of one of the N input ports 210 and one of the N output ports 220. According to the advantageous embodiment, switch 111 is a CIOQ switch with each input buffer 210 or output buffer 220 operating in an internal speed-up of one or two, with respect to the input/output link rate of one cell per time slot. Specifically, the VOQ scheme is adopted to organize queuing cells at each input buffer. The output buffer of each output port is for storing cells transmitted from the internally buffered crossbar before those cells are relayed to the next hop (e.g., for purpose of packet re-assembly).

Each internal buffer $B_{i,j}$ is used distinctly for buffering cells transmitted between input port i and output port j. Moreover, internal buffers not on the same row, i, can be written simultaneously and internal buffer not on the same column, j, can be read simultaneously. In other words, at each time slot, each input port 210 or output port 220 with an internal speed-up S can transmit to or receive from the internally buffered crossbar up to S cells, respectively. For notation simplicity, internally buffered crossbar switch 111 may be called the IBX switch hereafter.

Specifically, a sample implementation of the internal buffered crossbar depicted by FIG. 3 could be as follows. Each internal buffer, $B_{ij}$, is a two-port fast static random access memory (SRAM) with a storage space of up to Y cells, where Y>=1. Reading and writing such an SRAM can be done simultaneously via the read and write ports, respectively. Furthermore, the procedure of writing or reading an SRAM comprises two steps: 1) configuring the addressed internal buffer for writing (or reading) operations; and 2) putting the written (or read) cell onto the data path connecting the input port (or output port) and the addressed internal buffer, $B_{ij}$.

The major benefit of employing an internally buffered crossbar as the interconnecting network is that it enables distributive scheduling of buffered cells. In other words, scheduling of buffered cells can be done independently by each arbiter dedicated to an input port or output port. Consequently, it does not encounter the scalability bottleneck for traditional VOQ/CIOQ switches, where the scheduling procedure based on bipartite matching of inputs and outputs is intrinsically centralized with a high scheduling complexity that has not yet been reduced to a practical embodiment.

Similar architectures with an internal buffered crossbar as the interconnecting network are employed by U.S. Pat. No. 5,199,028 and U.S. Pat. No. 6,195,335, wherein FIFO queuing or VOQ are used for organizing each input buffer and contentions for input/output ports are resolved by simple rotating priority mechanisms. An essential difference between the present invention and the prior art switching devices is that, instead of using a simple rotating priority mechanism to resolve input/output contentions, the present invention uses the internally buffer crossbar to overcome the head-of-line (HOL) blocking problem of input-queued switches and to achieve optimal performance in terms of throughput and bandwidth/delay guarantees for IBX switches.

Using the internal buffered crossbar illustrated in FIG. 3 to solve HOL blocking problem is only one embodiment of the present invention. Assembling all of the N×N internal buffers on a single component (i.e., switch fabric 230) is not necessary. In an alternate embodiment of the present invention, the N×N internal buffer array could be distributed over input ports 210 and output ports 220, as that shown in FIGS. 4 and 5. In the exemplary embodiment shown in FIG. 4, in addition to the input buffers normally found in Input Ports 1, 2, 3 and 4 and the output buffers normally found in Output Ports 1, 2, 3 and 4, the 4×4 internal buffer array associated with switch fabric 230 (i.e., B11 through B44) is distributed across the four output ports. Similarly, in FIG. 5, in addition to the input buffers normally found in Input Ports 1, 2, 3 and 4 and the output buffers normally found in Output Ports 1, 2, 3 and 4, the 4×4 internal buffer array associated with switch fabric 230 is distributed across the four input ports.

Figure 6:
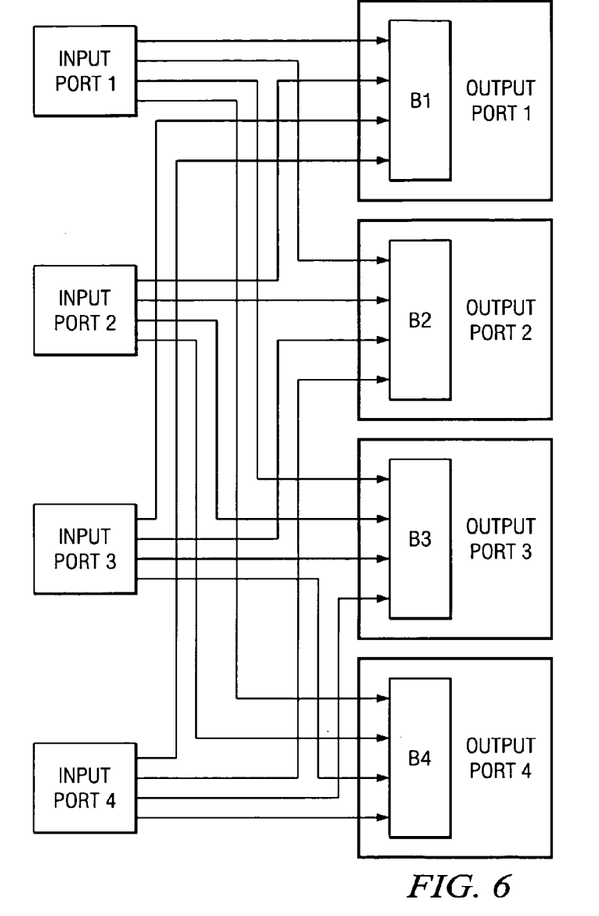
FIG. 6 illustrates a distributed switch fabric in the exemplary packet switch according to a third alternate embodiment of the present invention.

FIG. 6 illustrates a distributed switch fabric in an exemplary packet switch 111 according to a third alternate embodiment of the present invention. In FIG. 6, each output port j has a fast internal speed-up of N output buffer $B_j$ that is shared, partially or completely, by cells from all input ports. Furthermore, each fast internal speed-up of N output buffer, $B_j$, is maintained such that, for each input, there is at least one cell free buffer space or at least a queuing cell from that input.

For any of the above-described switch architectures, the present invention provides distributed scheduling algorithms that utilize the internal buffers to overcome the scheduling bottlenecks of a traditional VOQ switch. In particular, a scheduling algorithm according to the principles of the present invention address two sub-problems, including 1) how to schedule queuing cells at input ports 210 to be transmitted to the internally buffered crossbar 230 and 2) how to schedule queued cells at the internally buffered crossbar 230 to be transmitted to the destination output ports 220.

Let IBX@Y denote an IBX switch with the size of each internal buffer being Y cell(s), where Y>=1. In addition, let $Q_{ij}$ denote the virtual output queue for cells at the input buffer of input port i and destined for output port j. Similarly, let $B_{ij}$ denote the internal buffer (at the buffered crossbar) for cells coming from input port i and destined for output port j. Without explicit specification, $C_{ij}$ and $C'_{ij}$ denotes the HOL cells at $Q_{ij}$ and $B_{ij}$, respectively. Further, $R_{ij}$ denotes the long-term average rate of the aggregated traffic flow arriving at input port i and destined for output port j. Finally, a HOL cell $C_{ij}$ of $Q_{ij}$ at the input port i is said to be eligible for participating in input scheduling only when its corresponding internal buffer $B_{ij}$ is not full.

Figure 7A:
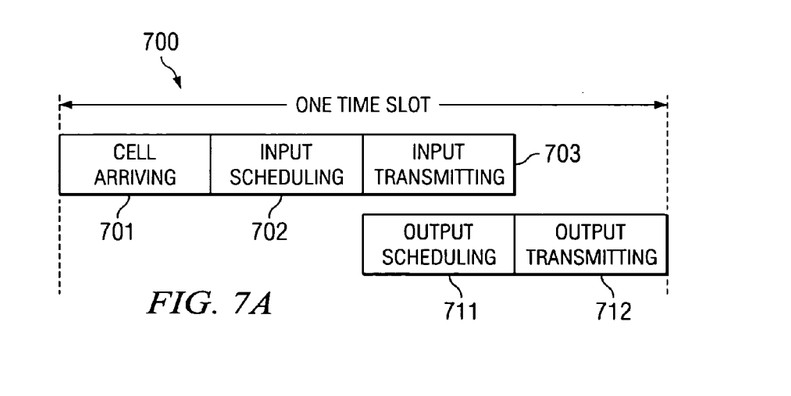
FIG. 7A illustrates the timing of events in a switch with an internal speed-up of 1.
Figure 7B:
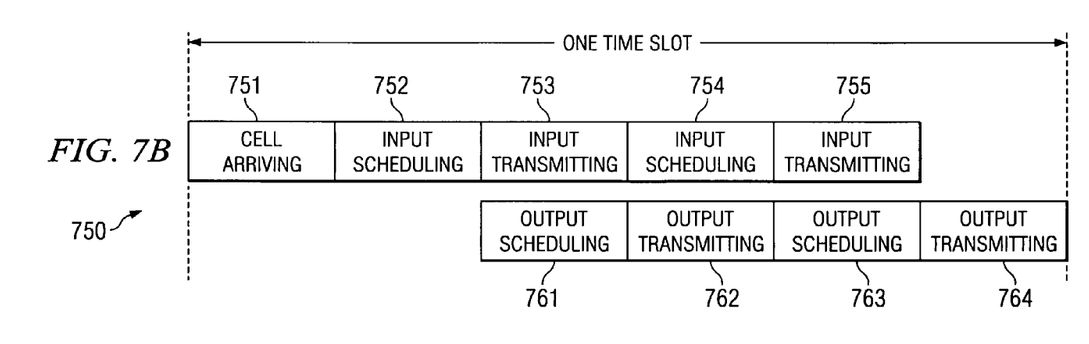
FIG. 7B illustrates the timing of events in a switch with an internal speed up of 2.

Without loss of generality, it is assumed that cells arrive or depart only at the beginning or end of each time slot, respectively. Specifically, the timing of events at a time slot are shown in FIGS. 7A and 7B. FIG. 7A illustrates the timing of events in a switch with an internal speed-up of 1. FIG. 7B illustrates the timing of events in a switch with an internal speed up of 2. The operation of each cycle of a time slot in FIG. 7A is as follows:

Cell Arriving (cycle 701): The information for input/output scheduling is extracted from the header of an arriving cell.

Input Scheduling (cycle 702): Each input port arbiter selects according to the input scheduling policy an eligible HOL cell for forwarding to its internal buffer.

Input Transmitting (cycle 703): Each HOL cell selected by the input scheduling cycle is transmitted to its internal buffer.

Output Scheduling (cycle 711): Each output port arbiter selects according to the output scheduling policy an internal buffered HOL cell destined for it for transmission to the output port.

Output Transmitting (cycle 712): Each internally buffered HOL cell selected by the output scheduling cycle is transmitted from its internal buffer to its destination output.

The operation of each cycle of the time slot in FIG. 7B is similar to the operation described above for FIG. 7A.

Scheduling Algorithms

The unique and novel scheduling algorithms provided by the present invention are logically split into four categories according to the achieved performance of the scheduled internally buffer crossbar (IBX) switch:

1. Achieving 100% throughput with explicitly specified bandwidth guarantees for each individual traffic flow;

2. Achieving high throughput (i.e., not less than 90%) without explicitly specified bandwidth guarantees for each individual traffic flow;

3. Integrated scheduling of traffic with and without explicitly specified bandwidth guarantees; and 4. Exact output queue (OQ) emulation with an internal speed-up of 2.

First, there is disclosed an algorithm that falls into the first category that provides a guaranteed bandwidth with 100% throughput, namely an input fair queuing (FQ)-output fair queuing (FQ) algorithm:

FQ—FQ Scheduling Algorithm

Input Scheduling: Each input port i selects one among the eligible HOL cells by any fair-queuing (FQ) algorithm with each $C_{ij}$ allocated a weight of $R_{ij}$.

Output Scheduling: Each output port j selects one among the internal buffered HOL cells by any fair-queuing (FQ) algorithm with each $C'_{ij}$ allocated a weight of $R_{ij}$.

For a group of K queues (K>=1) sharing a server with a service capacity of 1 and $$\sum_{i=1}^{K} R_i \leq 1,$$

where $R_i$ is the bandwidth claimed by queue i to be guaranteed, scheduled by a fair-queuing algorithm, any queue being non-empty over a time interval T can be guaranteed a service capacity of $R_iT+E$, where E is a constant.

If each internal buffer has a buffer size not less than two cells, scheduled by the above algorithm, each $Q_{ij}$ can be strictly guaranteed a service rate (i.e., bandwidth) of not less than $R_{ij}$ whenever it is non-empty. Further bandwidth guaranteeing variants include any static or dynamic bandwidth allocating scheme in which bandwidths are guaranteed in a probabilistic manner or a deterministic manner, meaning that whenever a queue is non-empty, it will be guaranteed by input/output scheduling a probability of being serviced not less than its claimed bandwidth.

The FQ—FQ algorithm can be used to schedule traffic with bandwidth guarantees, where the guaranteed bandwidths are explicitly specified. If the long-term average rate of a traffic flow cannot be known in advance, a rate-adaptive scheduling algorithm can be applied for the arrival rate estimation. Consequently, an IBX@2 scheduled by the FQ—FQ algorithm with each $R_{ij}$ being dynamically estimated by the rate adapting algorithm can achieve a theoretically guaranteed 100% throughput independent of offered traffic.

Although traffic rate tracking and adapting techniques may be employed to handle the problem of dynamic scheduling with 100% throughput, additional effort is required that will complicate the system design. In a worst case, it may not be feasible under extremely high-speed environments. To avoid this problem, the scheduling algorithms provided by the present invention require no prior knowledge on the offered traffic are present below.

The second category of scheduling algorithms achieves high throughput (i.e., not less than 90%) without explicitly specified bandwidth guarantees for each individual traffic flow. The present invention provides four specific scheduling algorithms that achieve high throughput without the need of explicitly specified traffic arrival rates:

1. LQF—LQF Scheduling Algorithm

Longest Queue First (LQF) Input Scheduling: Each input port selects among the eligible HOL cells the one having the longest virtual output queue.

Longest Queue First (LQF) Output Scheduling: Each output port selects among the eligible internally buffered HOL cells destined for that output port the one having the longest virtual output queue.

Using the LQF—LQF algorithm, each input/output arbitration has a complexity of O(LogN) to select the maximum over N data. Therefore, the overall complexity is O(NLogN), which is far less than the O($N^3$LogN) for scheduling a pure VOQ switch achieving 100% throughput independent of offered traffic. In addition to the LQF—LQF algorithm, the present invention provides three other LQF-like algorithms with low complexity and similar switch performance:

2. GQF-LQF Scheduling Algorithm

Growing Queue First (GQF) Input Scheduling: At each input port, if the HOL cell of the growing virtual output queue (i.e., the queue has a newly arriving cell in the current time slot) is eligible, select it. Otherwise, select one among the eligible HOL cells according to a round-robin-like algorithm.

Longest Queue First (LQF) Output Scheduling: Each output selects over the internal buffered HOL cells destined for it the one from the currently longest virtual output queue.

So far, as observed from simulation experiments, an internally buffered crossbar with a speedup of 1 (IBX@1) scheduled by the LQF—LQF algorithm or the GQF-LQF algorithm works well with 100% throughput achieved, under sparsely distributed traffic, including uniform and non-uniform, Bernoulli, and on/off bursty traffic. Cells arriving at an input of the switch are said to be sparsely distributed if their destination outputs are distributed sparsely (i.e., not concentrating on a small number (e.g., 1 or 2) of outputs). In the case of non-sparsely distributed traffic, regardless of whether it is uniform or non-uniform, correlated or uncorrelated, an IBX@1 can still sustain a high throughput of not less than 90%, as observed from the simulation experiments.

From a long-run scenario, the GQF input scheduling resolves input contentions with the arriving rate of a virtual output queue as the weight of its contending HOL cell (i.e., the greater average rate and the greater winning probability). Another method of "on-the-fly" estimation of the average arrival rate of each queue is to use the inter-arrival time between two cells as the weight (e.g., shortest inter-arrival time first (SITF) and longest inter-arrival time first (LITF)) as described below:

3. SITF-LQF Scheduling Algorithm

Shortest Inter-arrival Time First (SITF) Input Scheduling: Each input port selects among the eligible HOL cells the one currently having the shortest inter-arrival time since the last cell arriving at the queue in which it resides.

Longest Queue First (LQF) Output Scheduling: Each output port selects among the internal buffered HOL cells destined for that output port the one currently having the longest virtual output queue.

4. LITF-LQF Scheduling Algorithm

Longest Inter-arrival Time First (LITF) Input Scheduling: Each input port selects among the eligible HOL cells the one currently having the longest inter-arrival time since the last cell arrival at the queue in which it resides.

Longest Queue First (LQF) Output Scheduling: Each output port selects among the internal buffered HOL cells destined for that output port the one from the currently longest VOQ.

As observed from simulation experiments, an internally buffered crossbar with a speed-up of 1 (IBX@1) switch scheduled by any of the proposed algorithms (i.e., LQF—LQF, GQF-LQF, SITF-LQF and LITF-LQF) can achieve 100% throughput for sparsely distributed traffic. However, a common shortcoming of these LQF-like algorithms is the so-called starvation problem, in which cells at a short queue may be blocked by cells from longer queues forever or for an intolerably long time.

Simulations showed that some starvation-free variations of the LQF-like algorithms (e.g., Oldest Cell First (OCF) input/output scheduling where a cell arriving at the switch earlier has a higher priority) could behave quite well also. Significant performance degradations with respect to that of the LQF—LQF are observed only when the traffic load is running into saturation. However, a shortcoming of OCF-type algorithms is that a time stamp value, either direct or indirect, must be recorded for computing the waiting time at the switch. This requirement introduces additional burdens, compared to the LQF—LQF algorithms, into updating the weight of each contending HOL cell. To solve this problem, a starvation-free variant of the LQF—LQF algorithm could take into account the HOL blocking time of a cell, leading to the below algorithm, for example:

GQAF—GQAF Scheduling Algorithm

Greatest Weight of Queue and HOL Age First (GQAF) Input Scheduling: Each input selects among the eligible HOL cells the one with the greatest weight, which is defined as the sum of its current virtual output queue length and HOL age. The HOL age of a cell is the time that it is awaiting at the HOL position of its virtual output queue.

Greatest Weight of Queue and HOL Age First (GQAF) Output Scheduling: Each output selects among the internally buffered cells destined for it the one with the greatest weight, which is defined as the sum of its current virtual output queue length and its age awaiting at the HOL position of its internal buffer.

Scheduled by the GQAF—GQAF algorithm, no cell will be starved, as its weight can be increased either by an arrival at its virtual output queue or a HOL blocking time. Therefore, it will not suffer from the starvation problem common to LQF-like algorithms.

The proposed scheduling algorithms demonstrate that further variants can be developed along this direction (i.e., weighted scheduling with the length of a virtual output queue as a parameter of the weighting function). Another potential direction is to exploit methods using the waiting time (or queuing delay) of a contending cell as its weighting factor. In summary, scheduling algorithm variants take into account the queue length and the cell waiting time information for input/output contention resolving.

So far, scheduling traffic with or without bandwidth guarantees have been addressed independently. However, in a real world environment, these two kinds of traffic are usually mixed together. The third category of scheduling algorithms disclosed herein provide for integrated scheduling of traffic with and without explicitly specified bandwidth guarantees, as follows:

Integrated Scheduling Algorithms

Input Scheduling: Each input port i performs a fair-queuing selection over the eligible HOL cells, where a bandwidth guaranteed cell $C_{ij}$ has a weight $R_{ij}$ and all cells without bandwidth guarantee share an aggregated weight of:

$$1 - \sum_{j=1}^{N} R_{ij}.$$

If a bandwidth guaranteed HOL cell is granted the chance, it is selected. Otherwise the GQAF input scheduling is run by the input port to select one from those without bandwidth guarantees.

Output Scheduling: Each output port j performs a fair-queuing selection over the internal buffered HOL cells destined for it, where a bandwidth guaranteed cell $C'_{ij}$ has a weight $R_{ij}$ and all cells without bandwidth guarantee share an aggregated weight of:

$$1 - \sum_{i=1}^{M} R_{ij}.$$

If a bandwidth guaranteed HOL cell is granted the chance, it is selected. Otherwise, the GQAF output scheduling is run by the output port to select one from those without bandwidth guarantee.

The above-described algorithms have addressed the problem of scheduling an internally buffered crossbar (IBX) switch to achieve high throughout (specifically, 100% throughput for sparsely distributed traffic) using no internal speed-up. In related co-pending U.S. patent application Ser. No. 10/036,809, entitled "Scalable Two-stage Virtual Output Queuing Switch and Method of Operation" and incorporated by reference above, there is disclosed an exact emulation of an OQ switch by a CIOQ switch using buffers with an internal speed-up of two, wherein the interconnecting network of the CIOQ switch is a bufferless crossbar. Exact emulation means that offered the same traffic, the cell departure process at each output port of the emulating switch is identical to that of the emulated switch.

However, stable matching has a complexity lower bound of $Q(N^2)$, preventing it from being used in a high-speed switch. This problem is overcome by an IBX switch that reduces the overall complexity to O(NLogN). Moreover, the scheduling is distributed over each input/output arbiter where each arbitration has a complexity of O(LogN), the same as that of an OQ switch.

The present invention uses the internally buffered crossbar to avoid the need of a computation-intensive centralized stable matching algorithm. Such a method was developed based on analysis on the problem of exactly emulating an OQ switch by a CIOQ switch with a bufferless crossbar.

The fourth category of scheduling algorithms disclosed herein provide for exact output queue (OQ) emulation with an internal speed-up of two, as disclosed in U.S. patent application Ser. No. 10/036,809. The following is an exemplary algorithm for doing OQ emulation by an IBX@1 switch with an internal speed-up of two.

OQ Emulation Scheduling Algorithm

Youngest Queue First (YQF) Input Scheduling: Each input port selects among the eligible HOL cells the one at the youngest queue (i.e., youngest queue first), where the age of a queue is defined as the time interval during which it remains non-empty.

Output Scheduling: Each output selects one of the internal buffered cells destined for it according to the scheduling algorithm employed by the emulated OQ switch.

It is worth noting again that all of the proposed algorithms enable distributed implementations, meaning that the critical path of scheduling queued cells can be shortened to a range far beyond what can be achieved by the centralized equivalents disclosed in the prior art for a VOQ/CIOQ switch with a bufferless crossbar.

Figure 8:
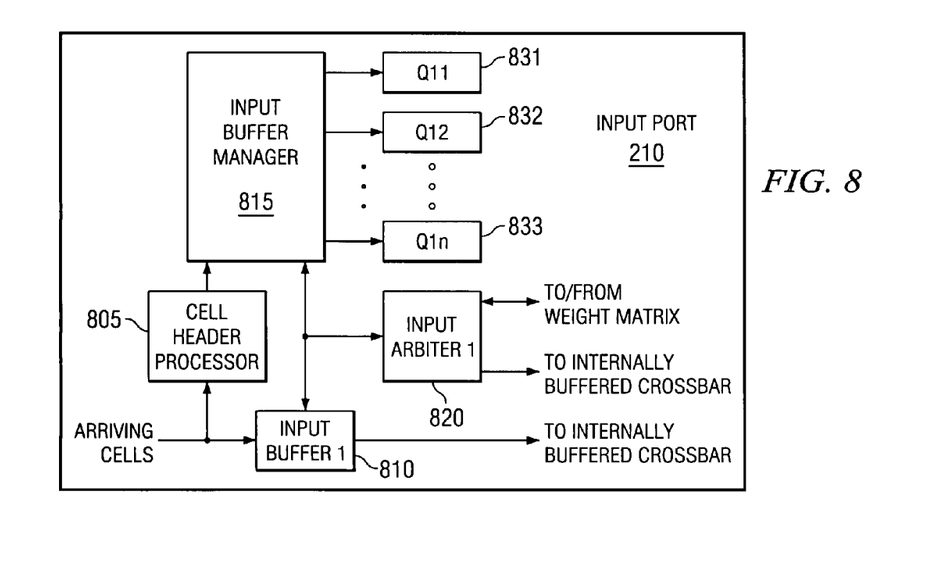
FIG. 8 illustrates in greater detail the architecture of an exemplary input port according to one embodiment of the present invention.

FIG. 8 illustrates in greater detail the architecture of exemplary input port 210 according to one embodiment of the present invention. Exemplary input port 210 comprises cell header processor 805, input buffer 810 (labeled Input Buffer 1), input buffer manager 815, input arbiter 820 (labeled Input Arbiter 1), and N virtual output queue (VOQ) registers, including exemplary VOQ registers 831, 832, and 833 (labeled Q11, Q12, and Q1n, respectively). Exemplary input port 210 is equivalent to input port 210A in FIG. 3, which writes cells into internal buffers B11, B12, . . . , B1n in the first row of internal buffers in switch fabric 230. Hence, the labels Input Buffer 1, Input Arbiter 1, Q11, Q12, Q1n all contain the numeral 1 to identify the first row of internal buffers.

The VOQ scheme is applied by input buffer manager 815 of each input port 210 for storing incoming cells into input buffer 810 according to the destination output port 220. Moreover, each internal buffer is a FIFO. Specifically, the LQF—LQF algorithm is run by the input/output arbiters to schedule the transmissions of contending HOL cells.

During the Cell Arriving Cycle, cell header processor 805 performs the following operations:

1) Extracts the destination output port 220 information from the header of the incoming cell; and 2) Notifies input buffer manager 815 of the destination output port 220 information of the incoming cell;

During the Cell Arriving Cycle, input buffer manager 815 performs the following operations:

1) Allocates a cell space in input buffer 810 for the incoming cell;

2) Stores the cell into the allocated buffer space;

3) Sets a pointer to the location of the stored cell to the corresponding virtual output queue register (i.e., Q11, Q12, Q1n, etc.) corresponding to the destination output port of the cell; and 4) Notifies input arbiter 820 of the arrival of the incoming cell.

During the Input Scheduling Cycle, input arbiter 820 performs the following operations:

1) Increases the weight, $W_{ij}$, of each VOQ register, $Q_{ij}$, by the number of newly incoming cells at $Q_{ij}$;

2) Selects among all the eligible HOL cells the one $C_{ij}$ at the $Q_{ij}$ with the greatest weight $W_{ij}$ for input transmitting, where ties are broken arbitrarily;

3) Decreases by one the weight $W_{ij}$ for the corresponding $Q_{ij}$ from which the cell was transmitted;

4) Notifies input buffer manager 815 of the selected HOL cell $C_{ij}$; and

5) Notifies internally buffered crossbar in switch fabric 230 of the selection of $C_{ij}$.

During the Input Transmitting Cycle, input buffer manager 815 performs the following operations:

1) Reads the pointer of the selected HOL cell from the corresponding VOQ register (i.e., Q11, Q12, . . . Q1n);

2) Deletes the pointer of the selected HOL cell from the VOQ register;

3) Retrieves the stored cell from input buffer 810 at the location given by the read pointer and transmits the retrieved cell to the internally buffered crossbar; and 4) Frees the input buffer space occupied by the retrieved cell.

During the Input Transmitting Cycle, the internally buffered crossbar in switch fabric 230 writes the cell $C_{ij}$ received from Input port 220 into the internal buffer, $B_{ij}$, in a FIFO order.

Figure 9:
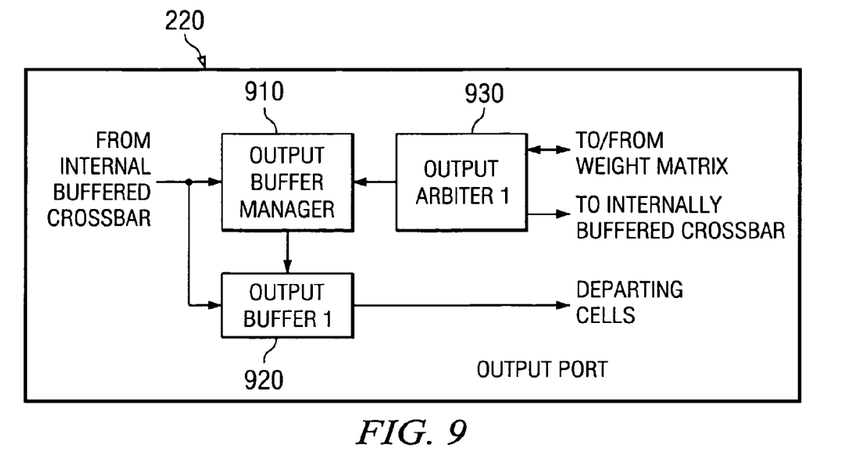
FIG. 9 illustrates in greater detail the architecture of an exemplary output port according to one embodiment of the present invention.

FIG. 9 illustrates in greater detail the architecture of exemplary output port 220 according to one embodiment of the present invention. Exemplary output port 220 comprises output buffer manager 910, output buffer 920 (labeled Output Buffer 1), and output arbiter 930 (labeled Output Arbiter 1). Exemplary output port 220 is equivalent to output port 220A in FIG. 3, which reads cells from internal buffers B11, B21, . . . , Bn1 in the first column of internal buffers in switch fabric 230. Hence, the labels Output Buffer 1 and Output Arbiter 1 contain the numeral 1 to identify the first column of internal buffers.

During the Output Scheduling Cycle, output arbiter 930 performs the following operations:

1) Selects among all the internal buffered HOL cells destined for output port 220 the one $C'_{ij}$ from the $Q_{ij}$ with the greatest weight $W_{ij}$ for output transmission, where ties are broken arbitrarily; and 2) Notifies the internally buffered crossbar of the selected internal buffered HOL cell.

During the Output Transmitting Cycle, output buffer manager 910:

1) Allocates a buffer space in output buffer 920 for the cell transmitted from the internal buffered crossbar; and 2) Writes the received cell into the allocated buffer space.

During the Output Transmitting Cycle, the internally buffered crossbar in switch fabric 230 retrieves the HOL cell, $C'_{ij}$, selected by output arbiter 930 from the internal buffer, $B'_{ij}$, and transmits the retrieved cell to output buffer 920.

A common attribute of the proposed scheduling algorithms is that the arbitration schemes are weighted. Each contending cell has a weight representing its priority, the cell with the greatest weight (i.e., highest priority) is selected to win the arbitration, where ties are brokenly arbitrarily. The key logic function of an input/output arbiter is to select the maximum over a set of weights. Given N weights represented by the integers $X_1, X_2, \ldots, X_N$, searching for the greatest can be done in a binary comparison manner.

Figure 10:
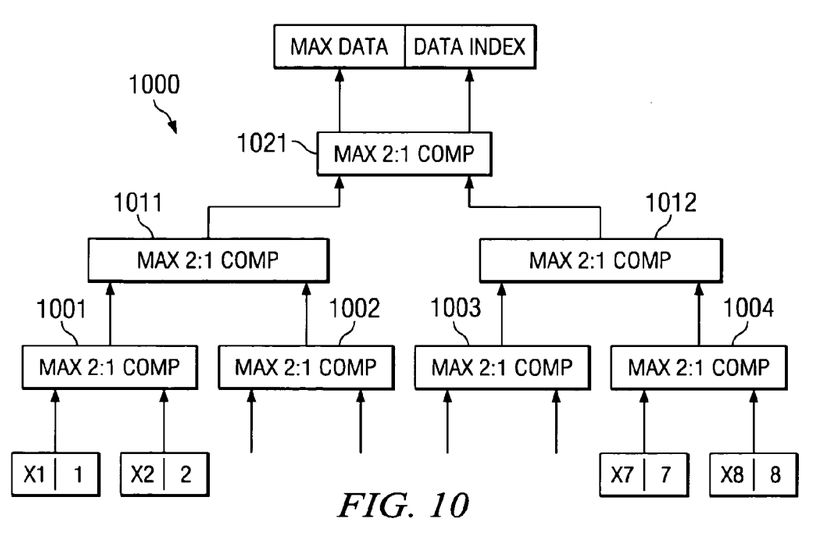
FIG. 10 illustrates an exemplary cell weight calculation circuit according to one embodiment of the present invention.

FIG. 10 illustrates exemplary cell weight calculation circuit 1000 according to an exemplary embodiment of the present invention. Cell weight calculation circuit 1000 comprises seven comparators that determine a maximum for a set of eight weights. Cell weight calculation circuit 1000 comprises a first comparator row containing four comparators, namely comparators 1001–1004, a second comparator row containing two comparators, namely comparators 1011 and 1012, and a third comparator row containing comparator 1021. Each of comparators 1001–1004 receives two pairs of data values. Each pair of data values consists of a cell weight, $X_i$, and the corresponding cell index. The index of each weight is unique, arranged from 1 to 8, for indexing of a cell weight.

In each of comparators 1001–1004, the weights of the two input data are compared. Depending on the comparison result, the cell weight having the greatest weight and the corresponding cell index are relayed to the second comparator row. Comparators 1011 and 1012 repeat the comparison on the two pairs of data values received from the outputs of comparators 1001–1004. Again, depending on the comparison results, the cell weights having the greatest weights and the corresponding cell index from each second row comparator are relayed to the third comparator row. Comparator 1021 then compares the pair of data values received from the outputs of comparators 1011–1012. The cell weight having the greatest weight and the corresponding cell index are then output by comparator 1021 as MAX DATA and DATA INDEX. The DATA INDEX value is used during input and output scheduling to map to the selected cell.

Figure 11:
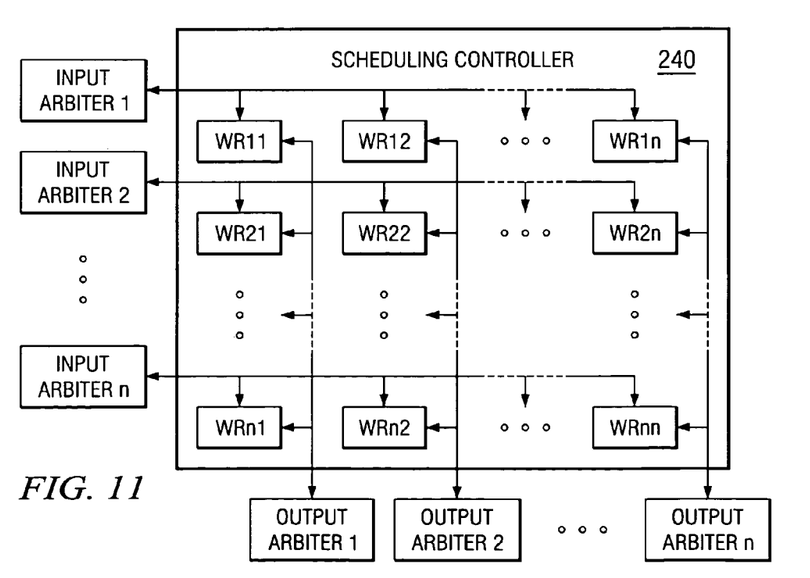
FIG. 11 illustrates in greater detail the architecture of an exemplary scheduling controller according to one embodiment of the present invention.

FIG. 11 illustrates in greater detail the architecture of exemplary scheduling controller 240 according to one embodiment of the present invention. Within the internal buffer crossbar of switch fabric 230, a weight register $WR_{ij}$ is provided between each pair of input arbiter i and output arbiter j. The weighting information stored in each $WR_{ij}$ is accessed (i.e., read and written) distinctly by input arbiter i and output arbiter j to resolve input and output contentions among cells, respectively according to the employed scheduling algorithm.

The present invention provides an apparatus as well as a process for scalable high-bandwidth data switching. It consists of two parts: the switch architecture and the scheduling algorithms. An important aspect of the invention is the hybrid architectural and algorithmic methodology for overcoming the HOL blocking problem of IQ switches. The disclosed methodology differs from the two principal prior art methods that are opposite and currently approaching their extremes, namely 1) improving the efficiency of scheduling an IQ switch with VOQ scheme (i.e., algorithmic) or 2) enlarging the output buffers of a CIOQ switch (i.e., architectural). The present invention achieves the optimum balance between the scalability of an IQ switch and the performance of an OQ switch.

Although the present invention has been described in detail, those skilled in the art should understand that they can make various changes, substitutions and alterations herein without departing from the spirit and scope of the invention in its broadest form.

What is claimed is:

1. A packet switch for switching cells, said packet switch comprising:

N input ports capable of receiving and storing cells in a plurality of input queues;

N output ports capable of receiving and storing cells from said N input ports in a plurality of output queues;

a switch fabric for transferring said cells from said N input ports to said N output ports, said switch fabric comprising an internally buffered crossbar having N×N internal buffers associated therewith, wherein each internal buffer is associated with a crosspoint of one of said N input ports and one of said N output ports; and a scheduling controller capable of:

selecting a first one of a plurality of queued head-of-line (HOL) cells from said input queues to be transmitted to a first one of said N×N internal buffers according to a fair queuing algorithm in which each of said queued HOL cells is allocated a weight of $R_{ij}$; and selecting a first one of a plurality of HOL cells buffered in a second one of said N×N internal buffers to be transmitted to a first one of said output queues according to the fair queuing algorithm in which each of said internally buffered HOL cells is allocated a weight of $R_{ij}$;

wherein a group of K queues share a combined capacity of 1, and $$\sum_{i=1}^{K} R_i \leq 1,$$

where $R_i$ is a guaranteed bandwidth associated with queue i, wherein any queue being non-empty over a time interval T can be guaranteed a bandwidth of $R_i T + E$, where E is a constant.

2. The packet switch as set forth in claim 1 wherein at least some of said N×N internal buffers are disposed within said switch fabric.

3. The packet switch as set forth in claim 1 wherein at least some of said N×N internal buffers are disposed within said N input ports.

4. The packet switch as set forth in claim 1 wherein at least some of said N×N internal buffers are disposed within said N output ports.

5. The packet switch as set forth in claim 1 wherein said N×N internal buffers are configured within said N output ports such that each output port has a fast internal speed-up of N output buffer that is shared at least partially by cells from all input ports.

6. A communication network comprising a plurality of packet switches capable of transferring data in cells, wherein at least one of said packet switches comprises:
 N input ports capable of receiving and storing cells in a plurality of input queues;
 N output ports capable of receiving and storing cells from said N input ports in a plurality of output queues;
 a switch fabric for transferring said cells from said N input ports to said N output ports, said switch fabric comprising an internally buffered crossbar having N×N internal buffers associated therewith, wherein each internal buffer is associated with a crosspoint of one of said N input ports and one of said N output ports; and
 a scheduling controller capable of:
  selecting a first one of a plurality of queued head-of-line (HOL) cells from said input queues to be transmitted to a first one of said N×N internal buffers according to a fair queuing algorithm in which each of said queued HOL cells is allocated a weight of $R_{ij}$; and
  selecting a first one of a plurality of HOL cells buffered in a second one of said N×N internal buffers to be transmitted to a first one of said output queues according to the fair queuing algorithm in which each of said internally buffered HOL cells is allocated a weight of $R_{ij}$;
 wherein a group of K queues share a combined capacity of 1, and $$\sum_{i=1}^{K} R_i \leq 1,$$

where $R_i$ is a guaranteed bandwidth associated with queue i, wherein any queue being non-empty over a time interval T can be guaranteed a bandwidth of $R_iT+E$, where E is a constant.

7. The communication network as set forth in claim 6 wherein at least some of said N×N internal buffers are disposed within said switch fabric.

8. The communication network as set forth in claim 6 wherein at least some of said N×N internal buffers are disposed within said N input ports.

9. The communication network as set forth in claim 6 wherein at least some of said N×N internal buffers are disposed within said N output ports.

10. The communication network as set forth in claim 6 wherein said N×N internal buffers are configured within said N output ports such that each output port has a fast internal speed-up of N output buffer that is shared at least partially by cells from all input ports.

11. A packet switch, comprising:
 a plurality of input ports for receiving and storing cells in a plurality of input queues;
 a plurality of output ports for receiving and storing cells from the input ports in a plurality of output queues;
 a plurality of internal buffers, each internal buffer associated with one of the input ports and one of the output ports; and
 a scheduling controller for:
  selecting one of a plurality of queued head-of-line (HOL) cells from the input queues to be transmitted to a first one of the internal buffers according to a weight allocated to each of the queued HOL cells; and
  selecting on of a plurality of HOL cells buffered in a second one of the internal buffers to be transmitted to one of the output queues according to a weight allocated to each of the internally buffered HOL cells.

12. The packet switch of claim 11, wherein the scheduling controller is capable of using a fair queuing algorithm to select the queued HOL cell and to select the internally buffered HOL cell.

13. The packet switch of claim 11, wherein a group of K queues shares a combined capacity of 1.

14. The packet switch of claim 13, wherein each queue in the group of K queues has a guaranteed bandwidth such that:

$$\sum_{i=1}^{K} R_i \leq 1$$

where $R_1$ is the guaranteed bandwidth associated with an $i^{th}$ queue in the group of K queues.

15. The packet switch of claim 14, wherein any queue being non-empty over a time interval T is guaranteed a bandwidth of $R_iT+E$, where E is a constant.

16. The packet switch of claim 11, wherein at least some of the internal buffers are disposed within a switch fabric comprising an internally buffered crossbar.

17. The packet switch of claim 11, wherein at least on of: at least some of the internal buffers are disposed within input ports; and at least some of the internal buffer are disposed within the output ports.

18. A method, comprising:
 receiving and storing cells in a plurality of input queues;
 transferring the cells from the input queues to a plurality of output queues using a plurality of internal buffers, each internal buffer associated with one of the input queues and one of the output queues; and
 receiving and storing the cells from the input queues in the plurality of output queues;
 receiving and storing the cells from the input queues in the plurality of output queues:
 wherein transferring the cells comprises:
  selecting one of a plurality of queued head-of-line (HOL) cells from the input queues to be transmitted to a first one of the internal buffers according to a weight allocated to each of the queued HOL cells; and
  selecting one of a plurality of HOL cells buffered in a second one of the internal buffers to be transmitted to one of the output queues according to a weight allocated to each of the internally buffered HOL cells.

19. The method of claim 18, wherein a group of K queues shares a combined capacity of 1.

20. The method of claim 19, wherein each queue in the group of K queue has a guaranteed bandwidth such that:

$$\sum_{i=1}^{K} R_i \leq 1$$

where $R_1$ is the guaranteed bandwidth associated with and $i^{th}$ queue in the group of K queues.

21. The method of claim 20, wherein any queue being non-empty over a time interval T is guaranteed a bandwidth of $R_iT+E$, where E is a constant.

22. The method of claim 18, wherein at least some of the internal buffers are disposed within a switch fabric comprising an internally buffered crossbar.

23. The method of claim 18, wherein at least one of: at least some of the internal buffers are disposed within input ports; and at least some of the internal buffers are disposed within output ports.

24. A communication network comprising a plurality of packet switches, at least one of the packet switches comprising:
- a plurality of inputs ports capable of receiving and storing cells in a plurality of input queues;
- a plurality of output ports capable of receiving and storing cells from the input ports in a plurality of output queues;
- a plurality of internal buffers, each internal buffer associated with one of the input ports and one of the output ports; and
- a scheduling controller capable of:
  - selecting one of a plurality of queued head-of-line (HOL) cells from the input queues to be transmitted to a first one of the internal buffers according to a weight allocated to each of the queued HOL cells; and
  - selected one of a plurality of HOL cells buffered in a second one of the internal buffers to be transmitted to one of the output queues according to a weight allocated to each of the internally buffered HOL cells.

25. A computer program embodied on a computer readable medium and operable to be executed by a processor, the computer program comprising computer readable program code for scheduling transfers of cells from a plurality of input queues to a plurality of output queues using a plurality of internal buffers, each internal buffer associated with one of the input queues and one of the output queues, the computer readable program code for scheduling the transfers comprising computer readable program code for:
- selecting one of a plurality of queued head-of-line (HOL) cells from the input queues to be transmitted to a first one of the internal buffers according to a weight allocated to each of the queued HOL cells; and
- selecting one of a plurality of HOL cells buffered in a second one of the internal buffers to be transmitted to one of the input queues according to a weight allocated to each of the internally buffered HOL cells.

* * * * *